(12) United States Patent
Ruland et al.

(10) Patent No.: US 8,912,745 B2
(45) Date of Patent: Dec. 16, 2014

(54) METHOD FOR OPERATING A MOTOR CONTROL UNIT FOR A DRIVE SYSTEM

(71) Applicants: Christian Ruland, Remshalden (DE); Oliver Heim, Schwieberdingen (DE)

(72) Inventors: Christian Ruland, Remshalden (DE); Oliver Heim, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 164 days.

(21) Appl. No.: 13/658,005

(22) Filed: Oct. 23, 2012

(65) Prior Publication Data

US 2013/0127387 A1    May 23, 2013

(30) Foreign Application Priority Data

Nov. 21, 2011    (DE) .......................... 10 2011 086 715

(51) Int. Cl.
*H02P 29/00*    (2006.01)
*F02D 41/14*    (2006.01)
*F02D 41/22*    (2006.01)

(52) U.S. Cl.
CPC ...... *F02D 41/1497* (2013.01); *F02D 2041/227* (2013.01); *Y02T 10/40* (2013.01); *F02D 41/22* (2013.01)
USPC .............................. 318/432; 318/34; 318/255

(58) Field of Classification Search
CPC .............................. Y02T 10/40; Y02T 10/642
USPC ............................................ 318/432, 34, 255
See application file for complete search history.

(56) References Cited

U.S. PATENT DOCUMENTS 5,155,797 A * 10/1992 Nomura et al. ............... 388/815
6,211,640 B1 * 4/2001 Fujisaki et al. ............... 318/636

* cited by examiner

*Primary Examiner* — David S Luo
(74) *Attorney, Agent, or Firm* — Kenyon & Kenyon LLP

(57) ABSTRACT

A method for operating a drive motor of a drive system, including the following: providing a control variable, which is ascertained as a function of one or multiple state variable(s) of the drive system and as a function of a default variable, to an output stage for operating the drive motor; reading the control variable previously provided to the output stage back from the output stage to obtain a read-back control variable; ascertaining a back-calculated torque from the read-back control variable; comparing the back-calculated torque and a predefined monitoring torque; and providing the control variable or an alternative control variable ascertained from the monitoring torque to the output stage as a function of a result of the comparison for the purpose of operating the drive motor.

11 Claims, 3 Drawing Sheets

METHOD FOR OPERATING A MOTOR CONTROL UNIT FOR A DRIVE SYSTEM

RELATED APPLICATION INFORMATION

The present application claims priority to and the benefit of German patent application no. 10 2011 086 715.5, which was filed in Germany on Nov. 21, 2011, the disclosure of which is incorporated herein by reference.

FIELD OF THE INVENTION

The present invention relates to motor control units, in particular measures for detecting and correcting errors in calculating one or multiple control variables which are used to control a drive motor.

BACKGROUND INFORMATION

Motor control units for use in drive systems for motor vehicles usually have functions which may be used to detect incorrect calculations of internal variables and control variables. Multilevel concepts are usually provided, system states being ascertained in a first level, the control level, and a default variable being evaluated, for example a driver-requested torque as an indication of a position of an accelerator pedal, and a setpoint torque being ascertained therefrom. The setpoint torque is converted into one or multiple corresponding control variable(s), depending on the type of drive motor. In the case of internal combustion engines, these control variables may include the fuel quantity to be injected, the point in time of injection, the air supply and the like. In electromotive drive systems, the control variable may correspond to, for example, a motor current.

In a second level, referred to as the monitoring level, the setpoint torque is redundantly ascertained according to the functions of the first level. However, instead of calculating the control variable from the setpoint torque, the control variable is read back from an output stage with the aid of a corresponding function in the monitoring level, and an actual torque provided by the drive motor is ascertained therefrom with the aid of a calculation inverse to the control level. The monitoring level then ensures, on the one hand, that the setpoint torque ascertained in the control level is limited by a monitoring torque ascertained in the monitoring level and, on the other hand, that the conversion of the setpoint torque ascertained on the control level into the corresponding control variable is checked by calculating an actual torque, which corresponds to the driving torque actually provided, from the control variable read back from the output stage. By comparing the back-calculated actual torque with the setpoint torque ascertained in the first level, it is possible to identify an error during conversion of the setpoint torque predefined on the control level into the control variable.

SUMMARY OF THE INVENTION

According to the exemplary embodiments and/or exemplary methods of the present invention, a monitoring device for monitoring a control unit for a drive system according to the description herein, as well as a method and a drive system according to the further descriptions herein, are provided.

Further advantageous embodiments of the present invention are specified herein.

According to a first aspect, a method for operating a drive motor of a drive system is provided. The method includes the following steps:

providing a control variable, which is ascertained as a function of one or multiple state variable(s) of the drive system and as a function of a default variable, to an output stage for operating the drive motor;

reading the control variable previously provided to the output stage back from the output stage to obtain a read-back control variable;

ascertaining a back-calculated torque from the read-back control variable;

comparing the back-calculated torque and a predefined monitoring torque;

providing the control variable or a alternative control variable ascertained from the monitoring torque to the output stage as a function of a result of the comparison for the purpose of operating the drive motor.

The error response known from the related art of providing an immediate limitation of the injection quantity as a function of the motor speed if the back-calculated actual torque deviates from the setpoint torque represents a response which is noticeable to the driver of a motor vehicle and substantially limits the drivability of the motor vehicle.

The above-mentioned method makes it possible to continue to safely operate a motor vehicle driven by the drive system even if an error occurs during conversion of a setpoint torque ascertained in the control level into the corresponding control variable, without substantially limiting the drivability of the motor vehicle. This is achieved by the fact that an alternative control variable is provided which is generated from a redundantly ascertained monitoring torque and which is transmitted to the output stage instead of the control variable.

A monitoring of the control variable is furthermore guaranteed on the basis of the read-back control variable, which ensures that only control variables which were able to be read back may be output to the output stage. This makes it possible to detect two error situations which have not been monitored up to now, namely, on the one hand, the error situation that the function for reading back the control variable in the monitoring level fails to be called and, on the other hand, the error situation that the function for reading back the control variable previously supplied to the output stage provides incorrect values in the monitoring level.

The alternative control variable may furthermore be provided to the output stage if the back-calculated torque is greater than the predefined monitoring torque.

It may be provided that the predefined monitoring torque is ascertained from the one or multiple state variables of the drive system and the default variable.

According to one specific embodiment, the control variable may be implemented by ascertaining a setpoint torque as a function of the one or multiple state variables of the drive system and as a function of the default variable as well as by subsequently ascertaining the control variable as a function of the setpoint torque.

It may be provided that the setpoint torque is limited by the monitoring torque.

The provision of the control variable or the alternative control variable to the output stage may be carried out according to a selection by a selection function.

The selection function may furthermore transmit the control variable or the alternative control variable directly to the output stage as the result of the selection.

According to another aspect, a device, in particular an arithmetic unit, is provided for monitoring the function of a control unit for a drive system having a drive motor, including:

an error response device for generating an alternative control variable as a function of a predefined monitoring torque;

a back-calculation device for ascertaining a back-calculated torque from a control variable read back from the output stage;

a comparator for comparing the back-calculated torque with the predefined monitoring torque;

an interface device which is configured to supply a provided control variable or an alternative control variable directly to the output stage as a function of a result of the comparison between the back-calculated torque and the predefined monitoring torque.

According to a further aspect, a drive system is provided, which includes:

a drive motor;

an output stage for operating the drive motor according to one or multiple control variables;

a control unit for ascertaining the one or multiple control variable(s) from one of multiple state variable(s) of the drive system and a default variable for provision to an output stage for the purpose of driving the drive motor;

the above-mentioned device.

According to a further aspect, a computer program product is provided which includes a program code which carries out the above-mentioned method when it is executed on a data processing device.

Exemplary embodiments of the present invention are explained in greater detail below on the basis of the attached drawings.

DETAILED DESCRIPTION

Figure 1:
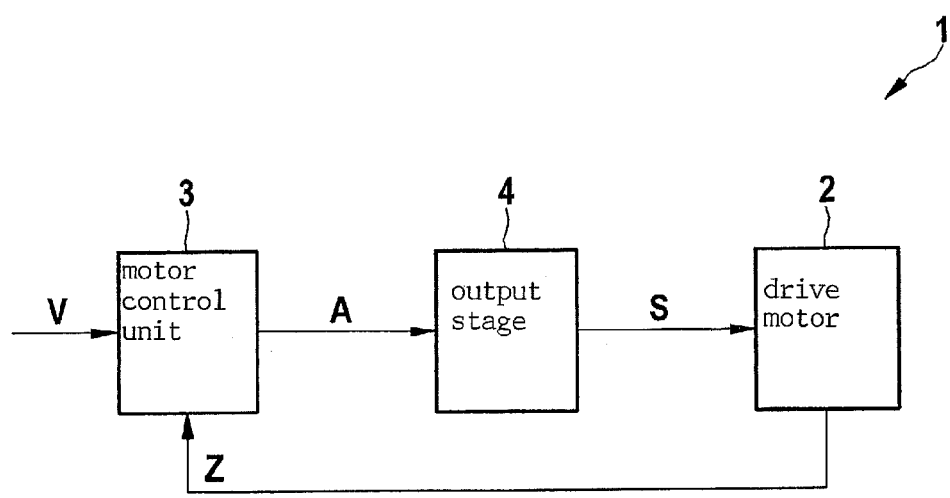
FIG. 1 shows a schematic representation of a drive system which has a control unit and a drive motor for a motor vehicle.

FIG. 1 shows a schematic representation of a drive system 1, for example for use in a motor vehicle. Drive system 1 includes a drive motor 2 which is operated as a function of a control variable A provided by a motor control unit 3 (control unit). Control variable A is supplied to an output stage 4 which converts the output variable to one or multiple corresponding manipulated variables S for setting actuators or the like.

Drive motor 2 may be an internal combustion engine, for example a diesel engine or a gasoline engine. However, drive motor 2 may also be an electric motor.

If it is a fuel-guided diesel engine, control variable A may provide an indication of an injection quantity which is converted by output stage 4 into corresponding opening times for a fuel injector (not shown). This means that the output stage electrically controls the injectors according to an opening and closing time for the purpose of injecting a predefined fuel quantity into combustion chambers of the cylinders due to the opening time periods of the injectors.

In a gasoline engine, the control variables usually relate to a throttle valve position as well as ignition points of an ignition device whose control is also carried out with the aid of a suitable output stage 4. The fuel injection follows the amount of air introduced into the combustion chambers of the cylinders. The control variable for the throttle valve position corresponds to an indication of the position of the throttle valve in the form of an electrical variable, and the control variable for the ignition points corresponds to trigger pulses for triggering the ignition.

If an electric motor is used as drive motor 2, control variable A corresponds to an indication of a motor current which is set by output stage 4. Output stage 4 then continues to handle the suitable control of the electric motor; in the event of a synchronous motor, for example, it handles the electronic commutation of the phases of the electric motor in the manner known from the related art.

Motor control unit 3 generates control variable A on the basis of an external default variable V, which may correspond to a driver-requested torque specified by an accelerator pedal position as a function of state variables Z, which are detected with the aid of sensors in drive motor 2 or are calculated therefrom according to a suitable model. The state variables may include, for example, a rotational speed or a temperature of drive motor 2.

Figure 2:
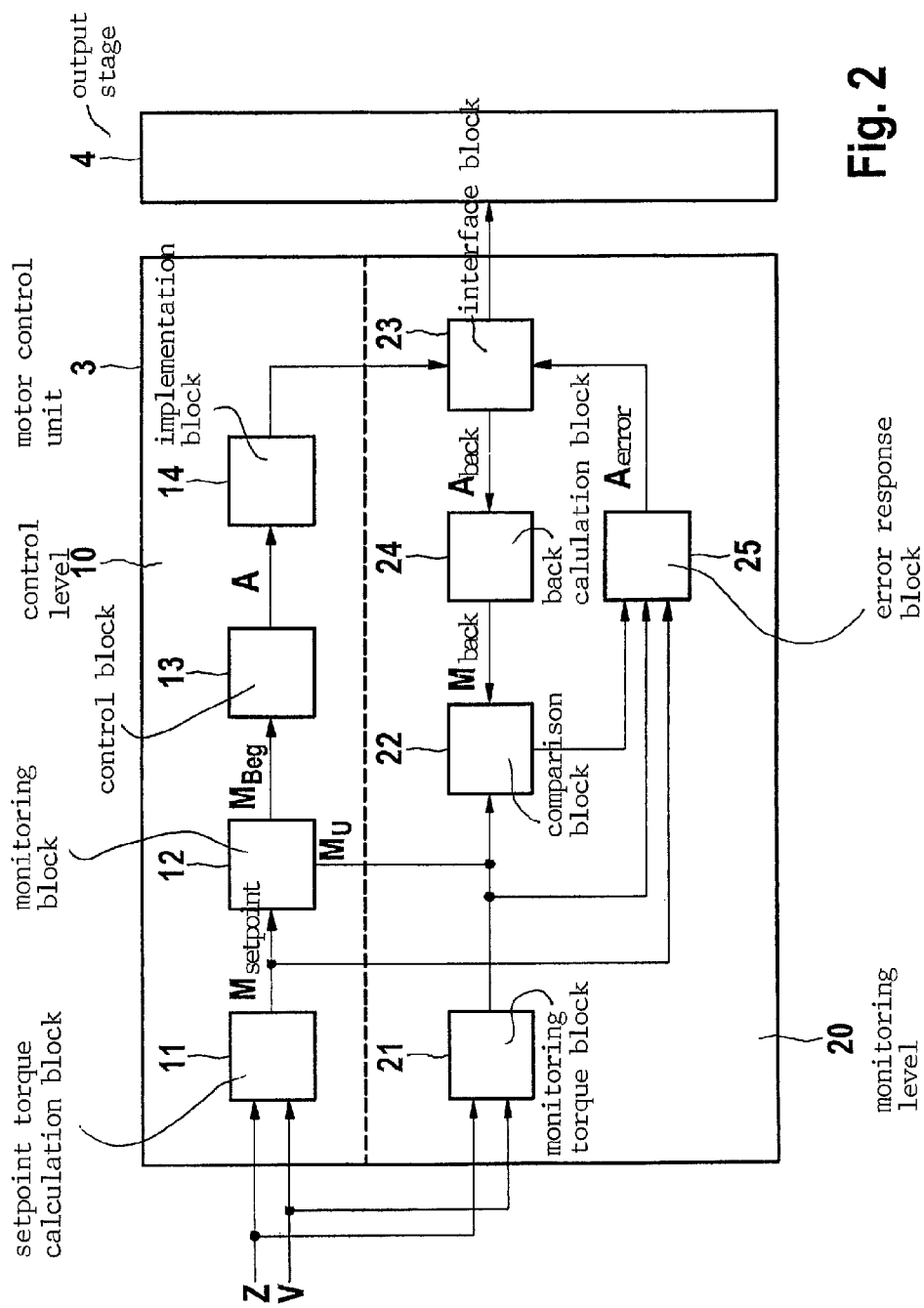
FIG. 2 shows a block diagram for illustrating the functions implemented in the control unit.

FIG. 2 shows a block diagram of the individual functions of motor control unit 3. In principle, motor control unit 3 is configured according to a multilevel monitoring concept. On a control level 10, a setpoint torque is first ascertained from state variables Z and default variable V, and the setpoint torque is subsequently converted into control variable A, for example into an indication of an injection quantity if a diesel engine is used as drive motor 2. The calculations of control level 10 are checked on a monitoring level 20 and, if an error is detected, alternative responses are called up.

Specifically, control level 10 includes a setpoint torque calculation block 11, to which default variable V and state variables Z are supplied, and which correspondingly calculates a setpoint torque $M_{Setpoint}$ to be provided by drive motor 2. In a monitoring block 12, setpoint torque $M_{Setpoint}$ is limited by monitoring torque $M_U$ received from monitoring level 20 to prevent any incorrect calculations of setpoint torque $M_{Setpoint}$ in setpoint calculation block 11 from resulting in undesirable responses of drive motor 2, for example due to the provision of an excessively high driving torque. If setpoint torque $M_{Setpoint}$ is limited in monitoring block 12, a suitable error response may be triggered.

Monitoring block 12 provides a monitored torque $M_{Beg}$ which is converted into a control variable A in a control block 13, for example into a piece of information about the fuel quantity to be injected if a diesel engine is used as drive motor 2. Depending on drive motor 2, indications of a throttle valve position, ignition points of an ignition device (in a gasoline engine) and the like, or an indication of a motor current (in an electric motor) may also be determined as control variables A from monitored torque $M_{Beg}$, as described above.

Control variable A may also be converted into corresponding control actions for combustion variables in an optionally provided implementation block 14. For example, control variable A may also be converted into valve control times for injectors of the diesel engine as an injection quantity ascertained for the monitored torque $M_{Beg}$ to be predefined. In alternative specific embodiments, however, control variable A may also be forwarded to an output stage 4 without any further conversion into combustion variables.

The functions of monitoring level 20 are described below. In monitoring level 20, monitoring torque $M_U$ is ascertained in a monitoring torque block 21 by a redundant calculation for calculation in setpoint torque calculation block 11. The redundant calculation of the setpoint torque from state variables Z and default variable V may be carried out according to an identical calculation, as in setpoint torque calculation block 11 or according to a simplified calculation. To obtain monitoring torque $M_U$, an offset is applied to a monitoring setpoint torque obtained in monitoring torque block 21 to prevent minor deviations in the calculations from causing an error response or an unnecessary limiting of setpoint torque $M_{Setpoint}$ calculated in control level 10. The function for ascertaining monitoring torque $M_U$ in monitoring torque block 21 is known from the related art and is not discussed in greater detail herein.

Monitoring torque $M_U$ is supplied to a comparison block 22 (comparator) which obtains a torque $M_{Back}$ which is back-calculated from control variable A, and an error is detected by back-calculated torque $M_{Back}$ if monitoring torque $M_U$ is exceeded.

In contrast to previous monitoring devices, an interface block 23 (interface device) is provided which, on the one hand, communicates control variable A, which is obtained from control block 13 or conversion block 14 in control level 10 to output stage 4, so that the appropriate actuators or drivers may be activated in the output stage for generating the desired torque.

On the other hand, control variable A communicated to output stage 4 is simultaneously read back. Read-back control variable $A_{Back}$ is forwarded to a back-calculation block 24 (back-calculation device) which calculates control variable A processed in output stage 4 to obtain back-calculation torque $M_{Back}$ according to a calculation which is inverse to the calculation of control block 13 or the calculations of control block 13 and conversion block 14.

Interface block 23 transmits control variable A to output stage 4 in synchronization with the rotational speed and reads corresponding control variable A converted in output stage 4 back again in synchronization with the rotational speed. This transmission of control variable A and the reading back of control variable A is then carried out shortly before control variable A is converted in drive motor 2 during a cyclical control action of drive motor 2, as is the case, for example, in internal combustion engines.

As long as no error is detected in comparison block 22, for example by back-calculated torque $M_{Back}$ exceeding monitoring torque $M_U$, control variables A ascertained in control level 10 are transmitted to output stage 4 with the aid of interface block 23 according to a normal mode.

However, if an error is detected in comparison block 22, an approximate value for control variable A is generated in an error response block 25 instead of the injection quantity limitation known from the related art. This approximate value is based on setpoint torque $M_{Setpoint}$ ascertained in control level 10 and monitoring torque $M_U$ ascertained in monitoring level 20. The minimum is formed from monitoring torque $M_U$ and setpoint torque $M_{Setpoint}$. The resulting minimum torque $M_{Min}$ is converted into an alternative control value $A_{Error}$ in a function corresponding to control block 13. Minimum torque $M_{Min}$ may be converted into alternative control variable $A_{Error}$ with the aid of known motor parameters and protected environmental parameters. This alternative control variable $A_{Error}$ may then be converted into a corresponding combustion variable in interface block 23.

In the function carried out in interface block 23, which reads control variable A back from output stage 4, error response block 25 signals that control variable A received from control level 10 is faulty if an error occurs. Once the error signal is present, alternative control variable $A_{Error}$ determined in error response block 25 is transferred to output stage 4 instead of control variable A received from control level 10.

During this error treatment, control variables A continue to be read back from output stage 4, and back-calculation torque $M_{Back}$ is ascertained therefrom. As long as comparison block 22 detects an error or throughout the entire driving cycle in progress, the error response carried out by error response block 25 remains activated and it is communicated accordingly to interface block 23, which outputs the alternative control variable to output stage 4 instead of control variable A supplied by control block 13.

Figure 3:
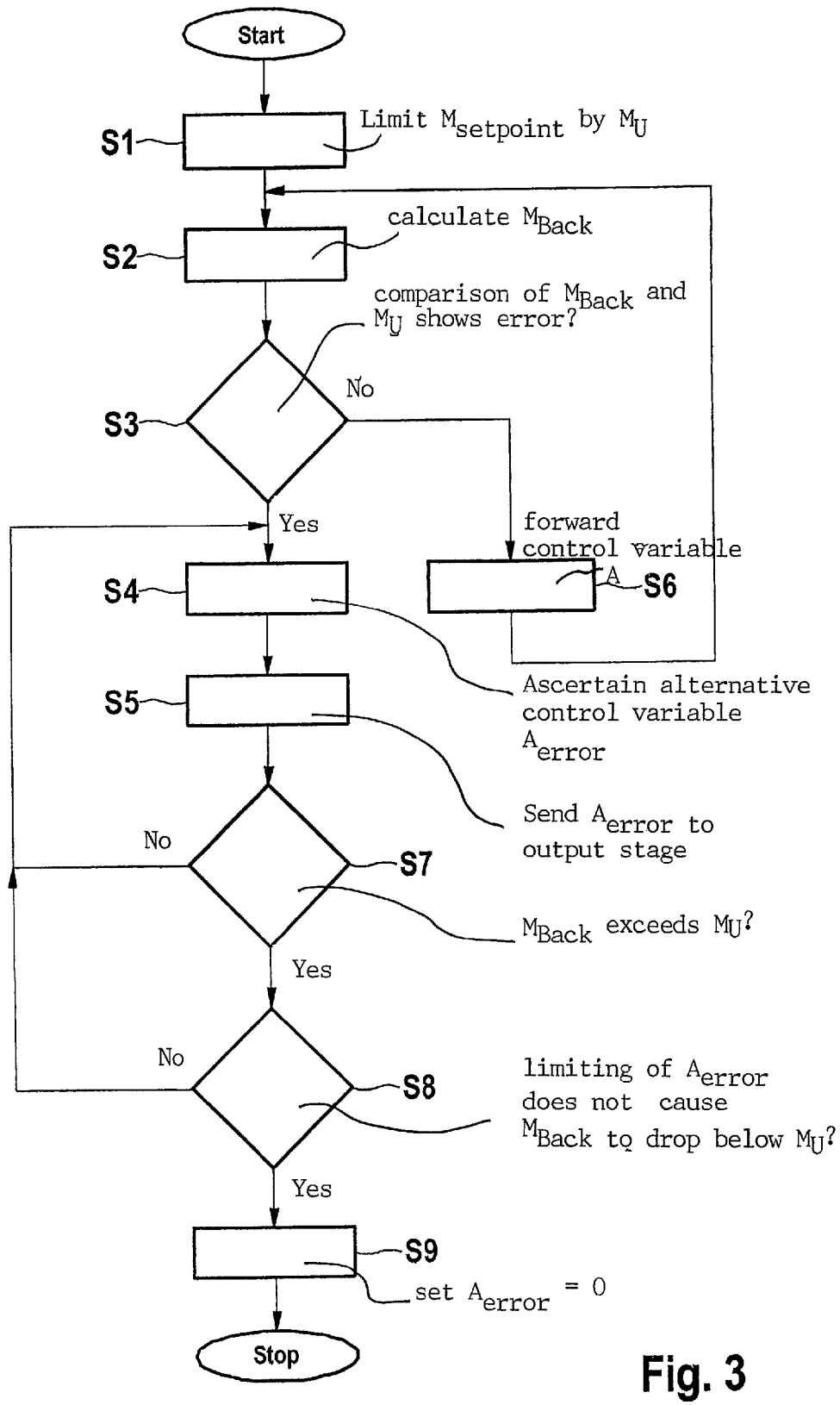
FIG. 3 shows a flow chart for illustrating a method for monitoring a function of the motor control unit.

FIG. 3 shows an error response chain of the monitoring system in the form of a flow chart. In step S1, setpoint torque $M_{Setpoint}$ ascertained in control level 10 is limited by monitoring torque $M_U$ ascertained in monitoring level 20 according to monitoring block 12 if setpoint torque $M_{Setpoint}$ exceeds monitoring torque $M_U$. Monitored torque $M_{Beg}$ is converted into a control variable A in control block 13 and provided to interface block 23. A monitoring torque $M_U$ is furthermore generated from state variables Z and default variable V in monitoring level 20.

In step S2, a control variable A previously transmitted to output stage 4 is also read back, and a back-calculated actual torque $M_{Back}$ is ascertained therefrom in back-calculation block 24. If a comparison of torque $M_{Back}$ which is back-calculated from control variable $A_{Back}$ read back from output stage 4 and monitoring torque $M_U$ detects an error in a query step S3 (by the back-calculated torque exceeding the monitoring torque; alternative: yes), alternative control variable $A_{Error}$ is ascertained in error response block 25 in step S4 on the basis of monitoring torque $M_U$ (in interface block 23), and corresponding alternative control variable $A_{Error}$ is communicated to output stage 4 in interface block 23 in step S5 instead of control variable A ascertained in control level 10. The method continues with step S7.

If no error is detected in step S3, i.e., if a comparison between back-calculated torque $M_{Back}$, which is ascertained from control variable $A_{Back}$ read back from output stage 4, and monitoring torque $M_U$ does not result in an error (by the back-calculated torque exceeding the monitoring torque; alternative: no), control variable A from control level 10 is forwarded to output stage 4 by interface block 23 in step S6. The method then returns to step S2.

If it is determined in step S7 that back-calculated torque $M_{Back}$ continues to exceed monitoring torque $M_U$ (alternative: yes), alternative control variable $A_{Error}$ may be limited, which may be as a function of the rotational speed, and the method may continue with step S8. Otherwise (alternative: no), the method returns to step S4.

If it is detected in step S8 that the limiting of alternative control variable $A_{Error}$ does not cause back-calculated torque $M_{Back}$ to drop below monitoring torque $M_U$ (alternative: yes), alternative control variable $A_{Error}$ is set to zero in step S9 so that output stage 4 no longer controls drive motor 2 or controls it in such a way that it comes to a stop. Otherwise (alternative: no), the method returns to step S4.

What is claimed is:

1. A method for operating a drive motor of a drive system, the method comprising:
    providing a control variable, which is ascertained as a function of one state variable or multiple state variables of the drive system and as a function of a default variable, to an output stage for operating the drive motor;
    reading the control variable previously provided to the output stage back from the output stage to obtain a read-back control variable;
    ascertaining a back-calculated torque from the read-back control variable;
    comparing the back-calculated torque and a predefined monitoring torque; and providing the control variable or an alternative control variable ascertained from the monitoring torque to the output stage as a function of a result of the comparison for the purpose of operating the drive motor.

2. The method of claim 1, wherein the alternative control variable is provided to the output stage if the back-calculated torque is greater than the predefined monitoring torque.

3. The method of claim 1, wherein the predefined monitoring torque is ascertained from one state variable or multiple state variables of the drive system and the default variable.

4. The method of claim 1, wherein the control variable is implemented by ascertaining a setpoint torque as a function of the one state variable or multiple state variable of the drive system and as a function of the default variable and by subsequently ascertaining the control variable as a function of the setpoint torque.

5. The method of claim 4, wherein the setpoint torque is limited by the monitoring torque.

6. The method of claim 1, wherein the provision of the control variable or the alternative control variable to the output stage is carried out according to a selection by a selection function.

7. The method of claim 6, wherein the selection function transmits the control variable or the alternative control variable directly to the output stage as the result of the selection.

8. A device or arithmetic unit for monitoring the functions of a control unit for a drive system having a drive motor, comprising:
  an error response device for generating an alternative control variable as a function of a predefined monitoring torque;
  a back-calculation device for ascertaining a back-calculated torque from a control variable read back from the output stage;
  a comparator for comparing the back-calculated torque with the predefined monitoring torque; and
  an interface device which is configured to supply a provided control variable or an alternative control variable directly to the output stage as a function of a result of the comparison between the back-calculated torque and the predefined monitoring torque.

9. A drive system, comprising:
  a drive motor;
  an output stage for operating the drive motor according to one control variable or multiple control variables;
  a control unit for ascertaining the one control variable or multiple control variables from one state variable or multiple state variables of the drive system and a default variable for provision to an output stage for operating the drive motor; and
  a device for monitoring the functions of a control unit for a drive system having a drive motor, including:
    an error response device for generating an alternative control variable as a function of a predefined monitoring torque;
    a back-calculation device for ascertaining a back-calculated torque from a control variable read back from the output stage;
    a comparator for comparing the back-calculated torque with the predefined monitoring torque; and
    an interface device which is configured to supply a provided control variable or an alternative control variable directly to the output stage as a function of a result of the comparison between the back-calculated torque and the predefined monitoring torque.

10. A non-transitory computer readable medium having a computer program, which is executable by a processor, comprising:
  a program code arrangement having program code for operating a drive motor of a drive system, by performing the following:
    providing a control variable, which is ascertained as a function of one state variable or multiple state variables of the drive system and as a function of a default variable, to an output stage for operating the drive motor;
    reading the control variable previously provided to the output stage back from the output stage to obtain a read-back control variable;
    ascertaining a back-calculated torque from the read-back control variable;
    comparing the back-calculated torque and a predefined monitoring torque; and
    providing the control variable or an alternative control variable ascertained from the monitoring torque to the output stage as a function of a result of the comparison for the purpose of operating the drive motor.

11. A non-transitory computer readable medium having a computer program, which is executable by a device, comprising:
  a program code arrangement having program code for operating a drive motor of a drive system, by performing the following:
    providing a control variable, which is ascertained as a function of one state variable or multiple state variables of the drive system and as a function of a default variable, to an output stage for operating the drive motor;
    reading the control variable previously provided to the output stage back from the output stage to obtain a read-back control variable;
    ascertaining a back-calculated torque from the read-back control variable;
    comparing the back-calculated torque and a predefined monitoring torque; and
    providing the control variable or an alternative control variable ascertained from the monitoring torque to the output stage as a function of a result of the comparison for the purpose of operating the drive motor;
  wherein the device is for monitoring the functions of a control unit for a drive system having a drive motor, including:
    an error response device for generating an alternative control variable as a function of a predefined monitoring torque;
    a back-calculation device for ascertaining a back-calculated torque from a control variable read back from the output stage;
    a comparator for comparing the back-calculated torque with the predefined monitoring torque; and
    an interface device which is configured to supply a provided control variable or an alternative control variable directly to the output stage as a function of a result of the comparison between the back-calculated torque and the predefined monitoring torque.

* * * * *